United States Patent
Bellur

(10) Patent No.: US 10,262,004 B2
(45) Date of Patent: Apr. 16, 2019

(54) NATIVE SNAPSHOTS IN DISTRIBUTED FILE SYSTEMS

(71) Applicant: Red Hat, Inc., Raleigh, NC (US)

(72) Inventor: Vijay Bellur, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 346 days.

(21) Appl. No.: 15/056,962

(22) Filed: Feb. 29, 2016

(65) Prior Publication Data

US 2017/0249216 A1  Aug. 31, 2017

(51) Int. Cl.
- G06F 17/30 (2006.01)
- G06F 11/14 (2006.01)
- G06F 3/06 (2006.01)

(52) U.S. Cl.
CPC ........ G06F 17/30194 (2013.01); G06F 3/06 (2013.01); G06F 17/30088 (2013.01); G06F 11/1446 (2013.01); G06F 2201/84 (2013.01)

(58) Field of Classification Search
CPC ........ G06F 17/30194; G06F 11/1446; G06F 2201/84; G06F 17/30088; G06F 3/06
USPC ............................................. 707/649
See application file for complete search history.

(56) References Cited

U.S. PATENT DOCUMENTS

| | | | | |
|---|---|---|---|---|
| 6,820,099 B1* | 11/2004 | Huber | ............... | G06F 17/30008 707/649 |
| 6,895,415 B1* | 5/2005 | Rezaul Islam | ........ | G06F 3/0611 |
| 7,035,881 B2* | 4/2006 | Tummala | .......... | G06F 17/30067 707/639 |
| 7,334,095 B1* | 2/2008 | Fair | ........................ | G06F 3/0607 711/161 |
| 7,412,460 B2* | 8/2008 | Hrle | ..................... | G06F 11/1466 707/648 |
| 7,457,982 B2* | 11/2008 | Rajan | ................ | G06F 17/30067 707/E17.01 |
| 7,555,504 B2* | 6/2009 | Bixby | ................ | G06F 17/30088 |
| 7,568,080 B2* | 7/2009 | Prahlad | ............... | G06F 11/1451 707/999.202 |
| 7,587,563 B1* | 9/2009 | Teterin | ................ | G06F 11/1435 711/161 |
| 7,743,031 B1* | 6/2010 | Cameron | .............. | G06F 3/0611 707/649 |

(Continued)

FOREIGN PATENT DOCUMENTS

| WO | WO-2012167582 A1 * | 12/2012 | .......... G06F 11/1451 |
|---|---|---|---|
| WO | WO-2015155614 A1 * | 10/2015 | ......... H04L 67/1095 |

OTHER PUBLICATIONS

Agarwal et al., "Snapshots in Hadoop Distributed File System", UC Berkeley Technical Report, UCB/EECS, 2011, 5 pages (Year: 2011).*

(Continued)

*Primary Examiner* — Phuong Thao Cao

(74) *Attorney, Agent, or Firm* — Womble Bond Dickinson (US) LLP; Daniel E. Ovanezian

(57) ABSTRACT

Methods and systems are disclosed to initiate a snapshot of a volume distributed across a plurality of storage nodes of a distributed file system. The systems may create in the plurality of storage nodes a writeable sub-volume associated with the volume of the distributed file system. The system may identify a previous writeable sub-volume associated with a previous snapshot and mark the previous writeable sub-volume as read-only.

17 Claims, 7 Drawing Sheets

(56) References Cited

U.S. PATENT DOCUMENTS

| | | | | |
|---|---|---|---|---|
| 7,827,350 B1* | 11/2010 | Jiang | | G06F 11/1469 707/639 |
| 7,882,071 B2* | 2/2011 | Fachan | | G06F 17/3015 707/639 |
| 7,987,156 B1* | 7/2011 | Chatterjee | | G06F 11/1451 707/638 |
| 7,996,414 B2 | 8/2011 | Alpern et al. | | |
| 8,069,149 B1* | 11/2011 | Chen | | G06F 11/1435 707/649 |
| 8,082,407 B1* | 12/2011 | Chatterjee | | G06F 9/4416 707/639 |
| 8,127,096 B1* | 2/2012 | Chatterjee | | G06F 3/0608 711/162 |
| 8,200,630 B1* | 6/2012 | Park | | G06F 17/30132 707/638 |
| 8,219,592 B2 | 7/2012 | Alpern et al. | | |
| 8,332,362 B2* | 12/2012 | McGovern | | G06F 17/30188 707/661 |
| 8,335,771 B1* | 12/2012 | Natanzon | | G06F 17/30008 707/684 |
| 8,352,785 B1* | 1/2013 | Nicklin | | G06F 17/30233 707/649 |
| 8,423,732 B1* | 4/2013 | Rajan | | G06F 17/30067 711/162 |
| 8,473,777 B1* | 6/2013 | Rangachari | | G06F 3/065 711/112 |
| 8,484,164 B1* | 7/2013 | Sivakumar | | G06F 3/0611 707/637 |
| 8,554,734 B1* | 10/2013 | Chatterjee | | G06F 11/1451 707/640 |
| 8,732,417 B1* | 5/2014 | Stringham | | G06F 11/1448 711/162 |
| 8,799,414 B2 | 8/2014 | Taylor et al. | | |
| 8,799,595 B1* | 8/2014 | Chatterjee | | G06F 11/1456 711/162 |
| 8,868,495 B2 | 10/2014 | Batterywala | | |
| 8,886,609 B2* | 11/2014 | Buragohain | | G06F 11/1461 707/649 |
| 8,935,206 B2* | 1/2015 | Aguilera | | G06F 11/1464 707/637 |
| 9,037,544 B1* | 5/2015 | Zheng | | G06F 17/30575 707/639 |
| 9,037,904 B2* | 5/2015 | Volvovski | | G06F 17/30 711/4 |
| 9,043,284 B1* | 5/2015 | Yadav | | G06F 17/30233 707/655 |
| 9,092,376 B1* | 7/2015 | Chelur | | G06F 17/30088 |
| 9,535,907 B1* | 1/2017 | Stringhann | | G06F 11/1435 |
| 9,720,619 B1* | 8/2017 | Shah | | G06F 12/0253 |
| 9,740,566 B2* | 8/2017 | Zheng | | G06F 11/1446 |
| 9,773,007 B1* | 9/2017 | Golden | | G06F 17/30088 |
| 9,778,990 B2* | 10/2017 | Forgette | | G06F 11/1446 |
| 9,792,296 B2* | 10/2017 | Beck | | G06F 11/2064 |
| 2002/0112022 A1* | 8/2002 | Kazar | | G06F 17/30106 709/217 |
| 2002/0184248 A1* | 12/2002 | Kachi | | G06F 17/30067 |
| 2003/0041225 A1* | 2/2003 | Mattina | | G06F 12/0824 712/30 |
| 2005/0004925 A1* | 1/2005 | Stahl | | G06F 21/566 |
| 2005/0033929 A1* | 2/2005 | Burton | | G06F 17/30088 711/162 |
| 2005/0065985 A1* | 3/2005 | Tummala | | G06F 17/30067 |
| 2005/0065986 A1* | 3/2005 | Bixby | | G06F 17/30088 |
| 2005/0066095 A1* | 3/2005 | Mullick | | G06F 17/30171 710/200 |
| 2006/0123209 A1* | 6/2006 | Borland | | G06F 11/2076 711/162 |
| 2006/0282483 A1* | 12/2006 | Hachio | | G06F 17/30115 |
| 2007/0271307 A1* | 11/2007 | Bergsten | | G06F 3/0613 |
| 2008/0046538 A1* | 2/2008 | Susarla | | G06F 3/061 709/217 |
| 2008/0126699 A1* | 5/2008 | Sangapu | | G06F 11/1435 711/114 |
| 2008/0183973 A1* | 7/2008 | Aguilera | | G06F 11/1464 711/147 |
| 2008/0256141 A1* | 10/2008 | Wayda | | G06F 3/0608 |
| 2009/0024814 A1* | 1/2009 | Eisler | | G06F 11/2094 711/162 |
| 2009/0138522 A1* | 5/2009 | Day, III | | G06F 11/2064 |
| 2011/0071983 A1* | 3/2011 | Murase | | G06F 9/5088 707/649 |
| 2011/0126186 A1 | 5/2011 | Srinivasan | | |
| 2011/0145526 A1* | 6/2011 | Parham | | G06F 3/061 711/162 |
| 2011/0167492 A1* | 7/2011 | Ghosh | | G06F 9/54 726/23 |
| 2011/0208909 A1* | 8/2011 | Kawaguchi | | G06F 3/0611 711/113 |
| 2011/0313973 A1* | 12/2011 | Srivas | | G06F 17/30194 707/634 |
| 2012/0101991 A1* | 4/2012 | Srivas | | G06F 17/30194 707/623 |
| 2012/0278553 A1* | 11/2012 | Mudhiganti | | G06F 17/30067 711/114 |
| 2013/0339301 A1* | 12/2013 | Saito | | G06F 17/30289 707/649 |
| 2014/0040199 A1* | 2/2014 | Golab | | G06F 17/30309 707/634 |
| 2014/0149698 A1* | 5/2014 | Ezra | | G06F 3/0614 711/162 |
| 2014/0244935 A1* | 8/2014 | Ezra | | G06F 3/0614 711/133 |
| 2014/0244952 A1* | 8/2014 | Raj | | G06F 11/1448 711/162 |
| 2014/0258239 A1* | 9/2014 | Amlekar | | G06F 11/1402 707/649 |
| 2014/0330787 A1* | 11/2014 | Modukuri | | G06F 11/20 707/659 |
| 2014/0337562 A1* | 11/2014 | Long | | G06F 3/0659 711/103 |
| 2015/0066857 A1* | 3/2015 | Dayal | | G06F 17/30088 707/639 |
| 2015/0127614 A1* | 5/2015 | Williams | | G06F 11/1448 707/649 |
| 2015/0134616 A1* | 5/2015 | Zheng | | G06F 17/30575 707/639 |
| 2015/0135174 A1 | 5/2015 | Bonzini | | |
| 2015/0207875 A1* | 7/2015 | Avati | | H04L 67/1095 709/203 |
| 2015/0248420 A1* | 9/2015 | Makkar | | G06F 17/30088 707/649 |
| 2016/0077920 A1* | 3/2016 | Regni | | G06F 17/30575 707/649 |
| 2016/0080495 A1* | 3/2016 | Bilas | | H04L 67/1097 709/224 |
| 2016/0103738 A1* | 4/2016 | Forgette | | G06F 11/1438 707/639 |
| 2016/0124977 A1* | 5/2016 | Jain | | G06F 3/0619 707/649 |
| 2016/0246683 A1* | 8/2016 | Vijayan | | G06F 17/30212 |
| 2016/0246802 A1* | 8/2016 | Regni | | G06F 17/30362 |
| 2016/0306840 A1* | 10/2016 | Deshmukh | | G06F 17/30368 |
| 2016/0320978 A1* | 11/2016 | Barve | | G06F 3/065 |
| 2017/0031769 A1* | 2/2017 | Zheng | | G06F 11/1446 |
| 2017/0031774 A1* | 2/2017 | Bolen | | G06F 11/1458 |
| 2017/0131914 A1* | 5/2017 | Day | | G06F 3/065 |
| 2017/0177611 A1* | 6/2017 | Gowdappa | | G06F 17/30194 |

OTHER PUBLICATIONS

Sarkar, P., "Instant Image: Transitive and Cyclical Snapshots in Distributed Storage Volumes", A. Bode et al. (Eds.): Euro-Par 2000, LNCS 1900, pp. 1284-1291, 2000. (Year: 2000).*

Klotzbuecher, Mini_Fo: The Mini Fanout Overlay File System, http://www.denx.de/wiki/bin/view/Know/MiniFOHome, Know, by DENX Software Engineering, published on Nov. 11, 2013, 3 pages.

(56) References Cited

OTHER PUBLICATIONS

Blomer et al., Micro-CernVM: Slashing the Cost of Building and Deploying Virtual Machines, http://arxiv.org/pdf/1311.2426.pdf, Nov. 11, 2013, 8 pages, CERN, CH-1211 Genève 23, Switzerland.
Blomer et al., The CernVM File System, http://cernvm.cern.ch/portal/sites/cernvm.cern.ch/files/cvmfstech-2.1-4.pdf, Mar. 2013, 48 pages.

* cited by examiner

US 10,262,004 B2

NATIVE SNAPSHOTS IN DISTRIBUTED FILE SYSTEMS

TECHNICAL FIELD

The present disclosure generally relates to distributed file systems for storing file system objects and taking snapshots of objects in the distributed file system.

BACKGROUND

Modern computers may include file systems that supports generating snapshots. In addition, distributed file systems may store objects of a file system across more than one computer system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
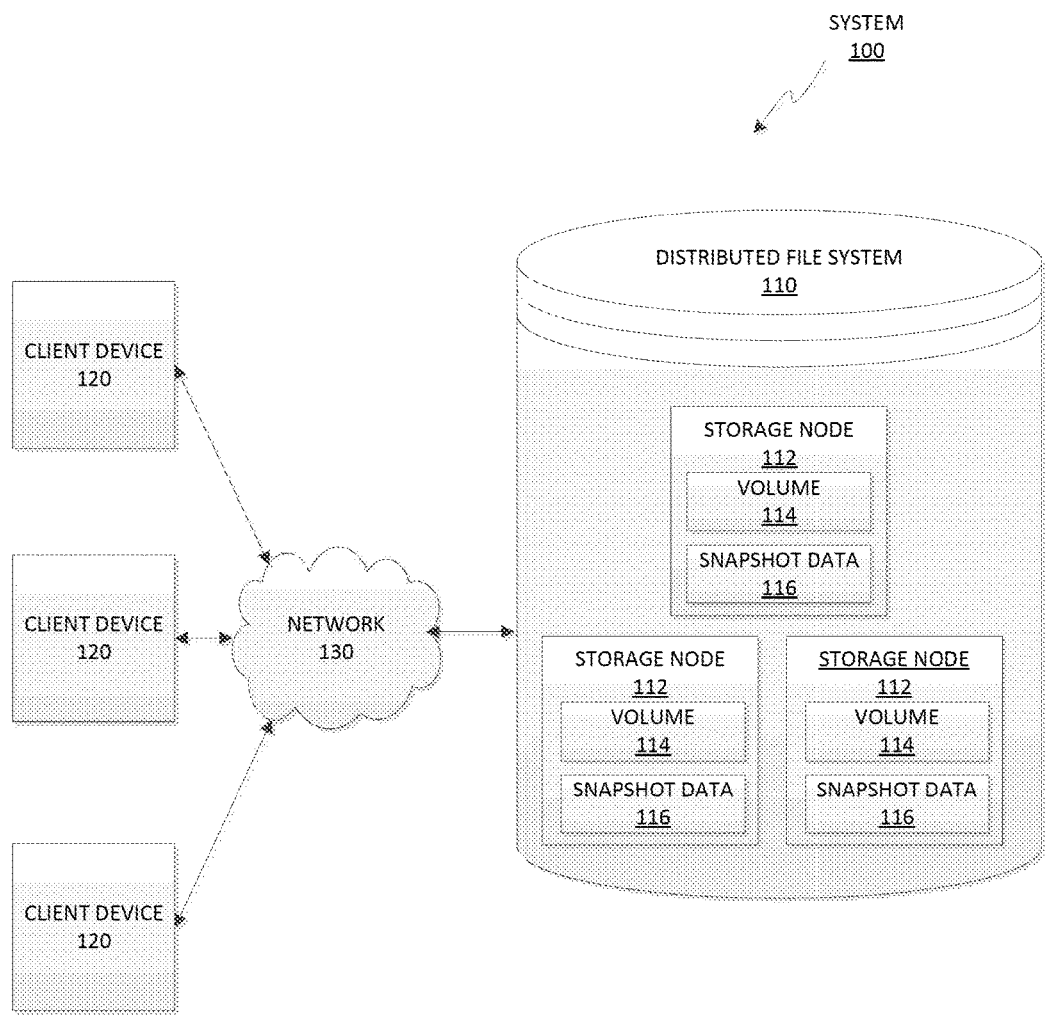
FIG. 1 depicts a high-level diagram of an example system architecture in accordance with one or more aspects of the present disclosure.

Described herein are methods and systems for creating and managing snapshots in a distributed file system. A snapshot may be a storage function allowing creation of a restore point of a computer system at a point in time. Snapshots of a distributed file system may store the state and data of a distributed file system at the time the snapshot is taken. A distributed file system may span one or more storage nodes and each of the storage nodes may be connected directly or indirectly with one or more other storage nodes. For example each storage node may be a server, computing device, or portion of memory that stores at least a portion of files in the distributed file system. Some or all of the storage nodes may store file system volumes or sub-volumes. The file system volumes may include files, portions of files, directories, metadata or a combination thereof. A subset of a volume may be referred to as a sub-volume. A volume or sub-volume may be stored on a single storage node, or may be stored across various storage nodes. For example, a volume or a sub-volume may be distributed over more than one storage nodes. A volume or sub-volume may be stored across various storage nodes in a manner to improve redundancy (e.g., by storing copies of portions of data on different storage nodes), efficiency of data exporting, storage efficiency, or to otherwise improve the operation of the distributed file system.

A distributed file system may take snapshots to provide a backup for data in the system. Some distributed file systems may use the underlying technology components of individual computer systems to offer support for volume snapshots. For example, individual computer systems may generate snapshots for volumes or sub-volumes present on the storage node using kernel operations of the computer system. However, distributed file systems may comprise multiple computer systems with different device specific components. These device specific components may generate and maintain snapshots using different methods or formats. The presence of such methods or formats may reduce the efficiency or compatibility of snapshot operations. In addition, snapshots that are based on components of a particular computer system may be lost if the distributed file system moves a volume of sub-volume to a different storage node. Furthermore, snapshots of a sub-volume may be stored in the same location as the sub-volume based on the technology of a particular computer system. Thus, dependence on the underlying components to achieve snapshots of data may reduce the ability of the distributed file system to create, access, and manage snapshots of a volume.

In order to address the above noted and other deficiencies associated with relying on snapshot capabilities of individual computer systems, a distributed file system may implement a native snapshot management. The native snapshot management system may create, access, and manage snapshots in the user-space of the distributed file system instead of relying on underlying technology components of individual computer systems. In the following description, numerous details are set forth, however, the present invention may be practiced without these specific details. In some instances, structures and devices are shown in block diagram form, rather than in detail, in order to avoid obscuring the present disclosure.

In some implementations, a snapshot management system may create a chain of sub-volumes to store snapshots of a volume. Each sub-volume in the chain of sub-volumes may also be referred to as a layer, with the top layer representing the most recent snapshot and the bottom layer representing the original volume. When a volume is created, the distributed file system may store it as a writeable volume. To take a snapshot, a writeable sub-volume may be created, and the original volume may be marked as a read-only sub-volume within the volume. The writeable sub-volume may act as a writeable layer on top of the read-only sub-volume. As additional snapshots are taken, the distributed file system creates a new writeable sub-volume layer and marks a previous writeable sub-volume as read-only. Each new writeable sub-volume may act as a layer on top of original volume and the previous writeable sub-volumes that have been marked as read-only sub-volumes. The aggregation of the read-only sub-volumes and writable sub-volumes can be used as snapshots for a volume in the distributed file system. For example, the distributed file system may revert to a snapshot restore point by removing sub-volumes down to the layer representing the snapshot restore point. The distributed file system may perform file system operations on one or more of the read-only or writeable sub-volumes as described below. The snapshot management system may operate in the user-space of the distributed file system to maintain the read-only and writeable sub-volumes used to create and maintain snapshots for the volume. Thus, the snapshots may be generated, maintained, and used in the user-space of the distributed file system independent of kernel operations of independent computer systems.

As file system objects (e.g., files, directories, or the like) are created, read, or modified by the distributed file system, a snapshot management system may make modifications to a current writeable sub-volume. For example, the snapshot management system may make modification for any files that are deleted, created, or modified by the distributed file system in the writeable sub-volume. Thus, each read-only sub-volume may be protected from modification and provide, in conjunction with any sub-volumes previously marked read-only, a snapshot of the state of the distributed file system of the time when it was marked as read-only. The snapshot management system may perform read operations in a read-only sub-volume without modifying a file system object. The read operation may be performed on a most recent read-only sub-volume in a chain of sub-volumes that has a copy of the file system object. Thus, read operations may be performed outside of a current writeable sub-volume. Each read-only sub-volume may be associated with a snapshot that occurred when the sub-volume was marked read-only. The snapshot management system may maintain a record of snapshots in the system, the time they occurred, and/or the sub-volume associated with a snapshot. In some implementations, metadata associated with a read-only sub-volume may indicate when the sub-volume was marked read-only. The snapshot management system may use such metadata to track snapshots for a volume.

When the distributed file system receives a call from a computer device to lookup a file system object, such as a file or directory, it may perform a lookup to the writable sub-volume first. The lookup may return one of three outcomes: the object is found, the object is not found, or a negative entry for the object is found. If the object is found in the writable sub-volume, the distributed file system may return the object, a copy of the object, or information about the object (e.g., metadata or statistics of the object) to the computer device that issued the lookup. For example, the distributed file system may transmit data stored in the object to a client device that requested the lookup. If an object is not found in the writable sub-volume, then the distributed file system may perform a lookup in the read-only sub-volumes associated with the volume. For example, the distributed file system may perform a lookup in read-only sub-volumes in the reverse order that the sub-volumes were marked read only until the object is found. The object, a copy of the object, or details of the object may then be returned to the computer device that sent the lookup instruction. By performing the lookup in sub-volumes associated with the most recent snapshots first, the distributed file system provides the most recent modifications of the object to the computer system. The distributed file system may also find a negative entry when performing a lookup operation. A negative entry may be a special character, text, metadata, or other data element that is stored in a location associated with the filename of an object. The distributed file system may recognize the negative entry as an indicator that the object has been deleted. If a negative entry is found for an object in the processes of searching the writable sub-volume or read-only sub-volumes, the distributed file system may return an error to the computer system indicating that the object does not exist in the file system.

In addition to lookup operations, the distributed file system may perform operations related to the metadata of objects. Such metadata items may represent the file system object attributes (such as the file size or file access permissions), creation/access/modification time, or the like. The distributed file system may perform read operations of metadata from the sub-volume where the object is located. To perform a write operation, the object must be in the writable sub-volume. If the object is in the writable sub-volume, then the metadata write operation is performed on the object in the writable sub-volume. If the object is in a read-only sub-volume, then the object is copied to the writable sub-volume before the change is performed. The distributed file system may return an error if a metadata operations is attempted on a negative entry.

Data operations may be performed in a similar manner to metadata operations. For example, a read operation may be performed on the most recent sub-volume that includes the object. If the object is in the writable sub-volume, then the distributed file system may perform the write operation on the object. If the object is in a read-only sub-volume, then the object is copied to the writable sub-volume before the change is performed.

In order to perform creation and deletion of objects, the distributed file system may consider both the information in the writable sub-volumes and any read-only sub-volumes. In response to an instruction to create an object from a computer device, the distributed file system may determine if such an object exists in the read-only layers. If no such object exists in the volume, the distributed file system may then create the object in the writable sub-volume. If a negative entry exists in the writable sub-volume, then a new object may be created in the writable sub-volume, and the negative entry may be removed from the writable sub-volume. If the object already exists in the writable sub-volume or a read-only sub-volume the distributed file system may return an error indicating that such an object already exists.

In order to perform directory operations, such as reading a directory, the distributed file system may perform a union of the writable sub-volume and each of the read-only sub-volumes. For example, to read a directory, the distributed file system may read directory entries in each of the writable and read-only sub-volumes. The distributed file system may then return a directory that includes each object that is in a directory of any of the sub-volumes. Thus reading a directory for a volume comprises returning the union of directories in each of the sub-volumes. The distributed file system may remove from the response any objects that have a negative entry. For example, an object may have an entry in a read-only sub-volume and a negative entry in later read-only sub-volume. The distributed file system may recognize that the object was deleted from the directory and remove it from a response to an instruction to read a directory.

In order to perform a delete operation on an object, the distributed file system may perform operations in addition to removing the object from the writable sub-volume. For example, if the distributed file system removes an object from the writable sub-volume, a later read operation may return a previous snapshotted version of the object from a read-only sub-volume. Therefore, the distributed file system may generate a negative entry in the writable sub-volume. The negative entry may be created in a directory referencing the object or in data associated with the object. A negative entry may be a special entry (e.g., character, text, metadata, or the like) that provides an indication to the distributed file system that the object has been deleted. In some implementations, the distributed file system may not generate a negative entry if the object exists only in the writable sub-volume. For example, an object created after the last snapshot was taken may exist only in the writeable sub-volume. In such cases, the distributed file system may remove the entry from the writable sub-volume and the deletion will be complete. For instance, there would be no record of the object in the read-only sub-volumes, thus a negative entry would be unnecessary. If the object exists only in one or more read-only sub-volumes, then a negative entry may be generated in the writable sub-volume. Thus, the read-only sub-volumes associated with previous snapshots maintain a record of the deleted object, but the distributed file system will return an indication that no object exists if a lookup, read, or write operation is attempted on the object. If the object exists in both the writable sub-volume and one or more read-only sub-volumes, then the object may be removed from the writable sub-volume, and a negative entry may be created in the writable sub-volume to indicate that the object is deleted. The read, write, and entry operations as described above enable protection of data in snapshots and a consistent and coherent view of the distributed file system to applications running on computer devices.

In addition to creation of snapshots and protection of snapshot data, a snapshot management system on a distributed file system may manage deletion of snapshots and reversion to snapshots. For example, maintaining many snapshots may utilize memory resources of the distributed file system. To reduce the impact of many snapshots, the distributed file system may be deleted according to a retention policy. The snapshot management system may delete a terminal snapshot or a non-terminal snapshot. The terminal snapshot is the most recent snapshot taken and is represented by the most recent read-only sub-volume (e.g., the sub-volume most recently marked as read-only). Modifications to the distributed file system after the most recent snapshot are represented by the writeable sub-volume. To delete the terminal snapshot, the snapshot management system may remove the writeable sub-volume and mark the most recent read-only sub-volume as writeable. In the case that the terminal snapshot is the only snapshot, the writeable sub-volume is removed and the volume that snapshot is for is marked writeable as if the volume has no snapshots.

If a non-terminal snapshot is to be deleted, the snapshot management system may merge any changes recorded in the snapshot being deleted with the next snapshot taken after the deleted snapshot. For example, all of the information from the sub-volume associated with the snapshot being deleted may be copied to the sub-volume associated with the next snapshot taken. In some cases, an object may exist in both read-only sub-volumes. In such cases, the distributed file system may keep the copy of the object from the snapshot sub-volume that is not being deleted and remove the copy of the object from the snapshot sub-volume that is being deleted. Once the copying is complete, the snapshot management system may remove the sub-volume associated with the snapshot being deleted. This process maintains the accuracy of the snapshots remaining in the distributed file system.

In order to revert to a given snapshot, the snapshot management system may remove the writeable sub-volume and any read-only sub-volumes associated with snapshots taken at a point in time after a snapshot reversion point. The distributed file system may revert to a snapshot to undo changes to a volume or to recover from a system malfunction. For example, if a file was accidentally deleted or becomes corrupted, the distributed file system may revert to a snapshot that has a record of a previous version of the file. For example, if four snapshots have been taken for a volume, and the distributed file system receives a command to revert to the first snapshot, then the snapshot management system may remove the writeable sub-volume, and the two read-only sub-volumes generated after the snapshot reversion point. The remaining read-only sub-volume that is associated with the snapshot reversion point may then be marked as writeable. The resulting file structure represents the state of the volume at the time of the reversion point.

FIG. 1 illustrates an example system 100, in accordance with an implementation of the disclosure. The system 100 may include client devices 120, a distributed file system 110, data storage nodes 112 and network 130. Network 130 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, and/or various combinations thereof.

Client devices 120 may include computing devices, server devices, or the like that communicate with distributed file system 110 to access file system objects stored on data storage nodes 114. In some implementations, client devices 120 may have a connection with one or more storage nodes 112. The connection may be an indirect connection with a node or a direct connection with a node. An indirect connection with a node may include a combination of one or more communication channels that passes through an intermediate node. For example, an indirect connection between a client device 120 and a storage node 112 may involve a first communication channel between the client device 120 and a different storage node 112 and a second communication channel between the two storage nodes 112. A direct connection is one in which a client device 120 has a communication channel between itself and a storage node 112 without traversing an intermediate node.

Distributed file system 110 may span multiple data storage nodes 112 and may be accessed by client devices 120 by traversing one or more networks. The storage nodes 112 may be capable of storing data for the distributed file system 110 and may function together to create, store, and modify file system objects. The storage nodes 112 may also work together to create and manage snapshots of volumes stored in the distributed file system 110. Each of data storage nodes 112 may correspond to a region of storage space (e.g., volume, sub-volume, partition) and may be arranged in a hierarchical manner such that one storage node 112 provides access to a volume of data storage additional storage nodes 112 each provide access to a portion of the volume (e.g., a sub-volume). In some implementations, storage nodes 112 may be located on separate computing devices. For example, each storage node 112 may be a separate server connected across a network. In another example, data storage nodes 112 may be associated with the same computing device. For example, data storage nodes 112 may be located on the same computing device and each of node devices 112 may be associated with a separate computing process that manages its portion of storage space. In another example, node devices 112 may be separate virtual machines operating on one or more computing devices.

Each of the separate client devices may be capable of participating in a distributed file system and may be a personal computing device (e.g., desktop, laptop, tablet, or the like), server device (e.g., server cluster), data storage device (e.g., Network Attached Storage (NAS) or Storage Area Network (SAN)) or other computing devices. Storage nodes 112 may contribute data storage resources, data processing resources or a combination thereof. In one example, all of the storage nodes 112 may provide data storage resources and data processing resources for distributed file system 110. In another example, one or more of the storage nodes 112 may provide data processing resources to manage other nodes without providing data storage resources to store file system objects for the distributed file system 110.

Distributed file system 110 may have decentralized file system management, centralized file system management or a combination of both (e.g., hierarchical). A decentralized file system management may include a file system that has more than one data storage node 112 (e.g., all nodes) managing the data storage activities of node devices 112. A centralized file system management may include a distributed file system where one of the storage nodes 112 manages the data storage activities of some or all of the other storage nodes 112. Distributed file system 110 may also have a partially centralized and partially decentralized management. For example, there may be an arrangement that includes multiple nodes arranged in a hierarchical arrangement (e.g., tree or star storage topology) such that a top-level node manages mid-level nodes and the mid-level nodes manage lower-level nodes.

Each of the storage nodes 112 may be associated with one or more computing processes that manage storage related activity for the node. The processes (e.g., daemons, application, services, or the like) may include, for example, a storage sharing process (e.g., export process), a storage access process (e.g., mount process), and a storage management process (e.g., rebalance process, snapshot process, or the like). The storage sharing process may be a server processes that provides a remote computing device, such as a client device 120 access to storage space of a storage node 112. Storage sharing process may support any data transfer technology such as to Network File System (NFS), Common Interconnected File System (CIFS), or other data transfer technology. The storage access process may be a client process that interacts with one or more storage sharing processes and retrieves data from a storage space located over a network. The storage management process may be a client or server process that handles storage management such as snapshotting volumes in the distributed file system 110.

File system volumes 114 may include one or more file system objects, directory objects and other information used by distributed file system 110 to store, manage, or organize data. Each file system volume 114 may include content (e.g., file data), metadata (e.g., inode) or a combination thereof. The metadata may include one or more attributes or extended attributes such as identifiers (e.g., GUID, UUID), names (e.g., file name, directory name), permissions (e.g., read, write execute), type (e.g., file type), ownership, creation time, or other attributes. A file system object may be a data structure that organizes data and identifies portions (e.g., locations) of a data store that stores the corresponding data. A directory object may be a data structure for cataloging one or more files and directories (e.g., subdirectories). Directories may be the same or similar to folders or catalogs and may be arranged in a hierarchical manner such that there are parent directories and child directories. A directory object may be associated with a layout that identifies files or directories within the directory object. The directory layout may include a reference pointer (e.g., linkto file, symbolic link) that points to one or more files within the same storage space (e.g., sub-volume) or a different storage space.

Although shown in FIG. 1 as having a single volume 114, a storage node 112 may include multiple volumes 114. In addition, a single volume 114 may be distributed over more than one storage node 112. For example, each of the storage nodes 112 shown in FIG. 1 may be associated with a single volume 114 and may each store different portions or sub-volumes of the volume 114.

A storage node 112 may also include snapshot data 116. Snapshot data 116 may include one or more read-only sub-volumes that represent snapshots taken by the distributed file system 110. The snapshot data 116 may also include a writeable sub-volume used for making changes to data in an associated volume 114. In some implementations, a writable sub-volume and read-only sub-volumes used to create and maintain snapshots are stored as part of volume 114, and the snapshot data 116 maintains data indicative of the snapshots that have been taken by the distributed file system 110. Snapshot data 116 on a storage node 112 may be used to take snapshots of a volume 114 located on the same storage node 112, or may be used to take snapshots of a volume 114 located on a different storage node 112. In some examples, a snapshot taken for a volume 114 may be managed with snapshot data 116 on more than one storage node 112.

The distributed file system 110 may generate snapshots of a volume 114 in response to a request by a client device 120 to take a snapshot. Snapshots may also be generated automatically or periodically by the distributed file system 110. For example, the distributed file system 110 may generate a snapshot at the beginning of each session of a client device 120 to maintain a record of a volume 114 accessed by the client device 120. Distributed file system 110 may also delete snapshots in response to a user request or based on a retention policy for snapshots. For example, the distributed file system 110 may delete a snapshot in response to a period of time since the snapshot was generated. In some implementations, different volumes 114 may have different policies for the creation and deletion of snapshots. In some implementations, the distributed file system 110 includes a separate process or device for management of snapshots within the distributed file system 110.

Figure 2:
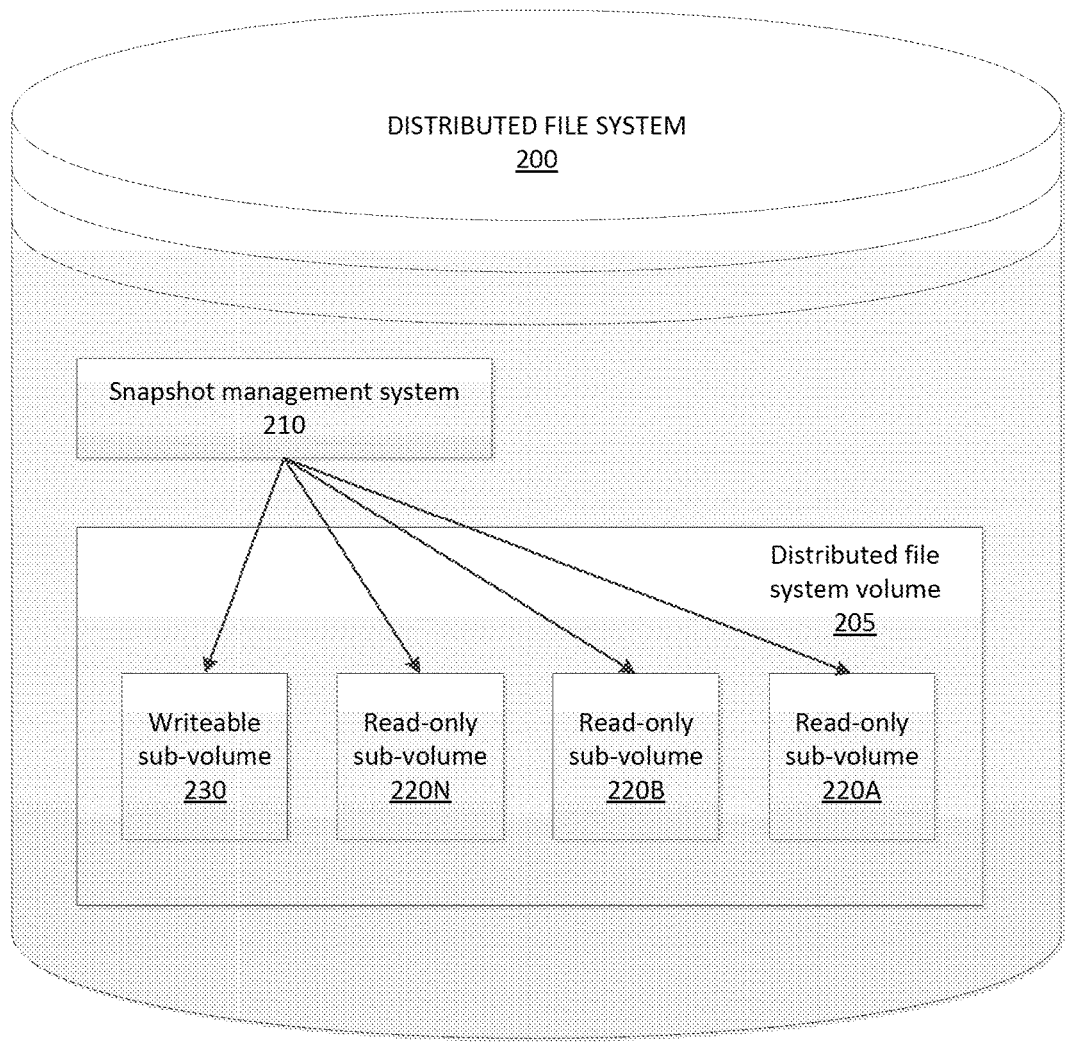
FIG. 2 depicts a logical view of a subset of a distributed file system operating according to some aspects of the disclosure.

FIG. 2 schematically illustrates a logical view of a subset of a distributed file system 200 operating in accordance aspects of the present disclosure. The distributed file system may operate similar to and include components similar to those described with reference to the distributed file system 110 in FIG. 1. For example, the distributed file system 200 may include one or more storage nodes and communicate with one or more client devices as described with reference to FIG. 1.

The distributed file system 200 may include a distributed file system volume 205. The volume 205 may be stored on one or more storage nodes (not shown) that are part of distributed file system 200. The distributed file system volume 200 may include one or more read-only sub-volumes 220A-220N and a writeable sub-volume 230. The read only sub-volumes 220A-220N may each represent a snapshot. For example, when the most recent snapshot was taken, the snapshot management system 210 may have created the writeable sub-volume 230 and marked the read-only sub-volume 220N as read-only. Prior to the snapshot, the read-only sub-volume 220N may have been a writeable sub-volume. The snapshot management system 210 may perform operations of snapshot creation, deletion, and reversion as discussed below.

In addition, the snapshot management system 210 may translate instructions received from client devices to perform file system operations on objects in the distributed file system 205. For example, in response to a read operation received at the distributed file system 200, the snapshot management system 210 may search the writeable sub-volume 230 first and then the read-only sub-volumes 220A-220N as necessary. Thus, a client device may provide file system instructions to the distributed file system 200 without specific instructions indicating where an object is located on the read-only sub-volumes 220A-220N or writeable sub-volume 230.

Rather, the snapshot management system 210 may receive a file name for an object and locate the object in the appropriate sub-volume. In response to receiving a file name or file path for an object, the snapshot management system 210 may translate the file name to a location in a writeable or read-only sub-volume that contains the data for the object. For example, the translator may access data in a particular sub-volume in response to receiving an instruction to access the data in the volume. In some implementations, the distributed file system 200 may include a separate translator that performs file system operations, while the snapshot management system 210 performs snapshot creation, deletion, and reversion operations. Example data operations of the snapshot management system 210 or a separate translator are described below with reference to FIG. 6.

FIGS. 3-6 depicts a flow diagram of illustrative examples of methods of creating, managing, and modifying snapshots within a distributed file system. The methods may be performed by processing devices that may comprise hardware (e.g., circuitry, dedicated logic), software (such as is run on a computer system or a dedicated machine), or a combination of both. The methods and each of their individual functions, routines, subroutines, or operations may be performed by one or more processors of the computer device executing the method. In certain implementations, the methods may be performed by a single processing thread. Alternatively, the methods may be performed by two or more processing threads, each thread executing one or more individual functions, routines, subroutines, or operations of the method. In an illustrative example, the processing threads implementing such methods may be synchronized (e.g., using semaphores, critical sections, and/or other thread synchronization mechanisms). Alternatively, the processes implementing the methods may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, the methods may be performed by storage nodes 112, or other components of distributed file system 110, as shown in FIG. 1 or by snapshot management system 210 of another component of distributed file system 200 as described with reference to FIG. 2.

Figure 3:
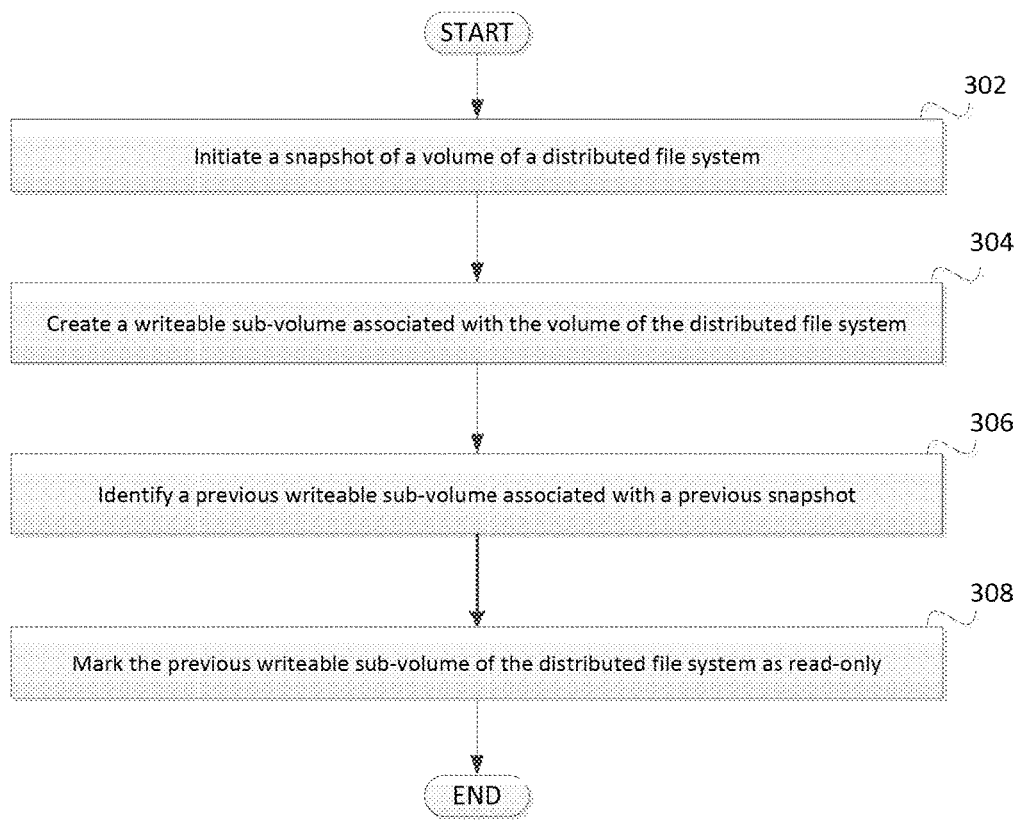
FIG. 3 depicts a flow diagram of an example method of creating a snapshot according to some aspects of the disclosure.

FIG. 3 depicts a flow diagram of an example method of creating a snapshot according to some aspects of the disclosure. In block 302, the distributed file system initiates a snapshot of a volume. For example, the snapshot may be initiated in response to a request by a client device or in response to a client device accessing the volume. In some implementations, the volume may have a policy that dictates when a snapshot is generated. For example, a policy may indicate that a snapshot should be generated periodically based on the passage of time or other parameters. Initiating a snapshot may comprise calling a process or sub-routine that manages snapshots in the distributed file system. For example, a snapshot management system may receive an instruction to create snapshot and initiate a process to perform file system operations that create the snapshot.

In block 304, the distributed file system creates a writeable sub-volume and associates the sub-volume with the volume for which the snapshot is being taken. For example, the distributed file system may generate a new entry in the distributed file system associated with the volume for which the snapshot is being taken.

Moving on to block 306, the distributed file system identifies a previous writeable sub-volume associated with a previous snapshot. The previous writeable sub-volume may include a record of changes to the volume since the previous snapshot. In order to take the new snapshot, the distributed file system may protect the changes recorded in the previous writeable sub-volume from being modified after the new snapshot. Thus, in block 308 the distributed file system marks the previous writeable sub-volume as read-only. In the case that the snapshot being taken is the first snapshot on a volume, the identified previous writeable sub-volume may be the volume itself. After the previous writeable sub-volume is marked as read-only the snapshot is complete.

As additional snapshots are taken according to the method described with reference to FIG. 3, a chain of read-only sub-volumes records the changes that were made previous in time to the current writeable sub-volume. Each of the read-only sub-volumes, along with the sub-volumes generated prior in time to it, represent a snapshot taken at the time the sub-volume was marked read-only. In some implementations, there is only a single writeable sub-volume at a time such that modifications and other data or entry operations are performed consistently. In some implementations, there may be more than one writeable sub-volume generated for a volume at a time in order to increase the efficiency of operations on the volume. In such implementations, the multiple writeable sub-volumes may all be converted to read-only when a new snapshot is taken.

Figure 4:
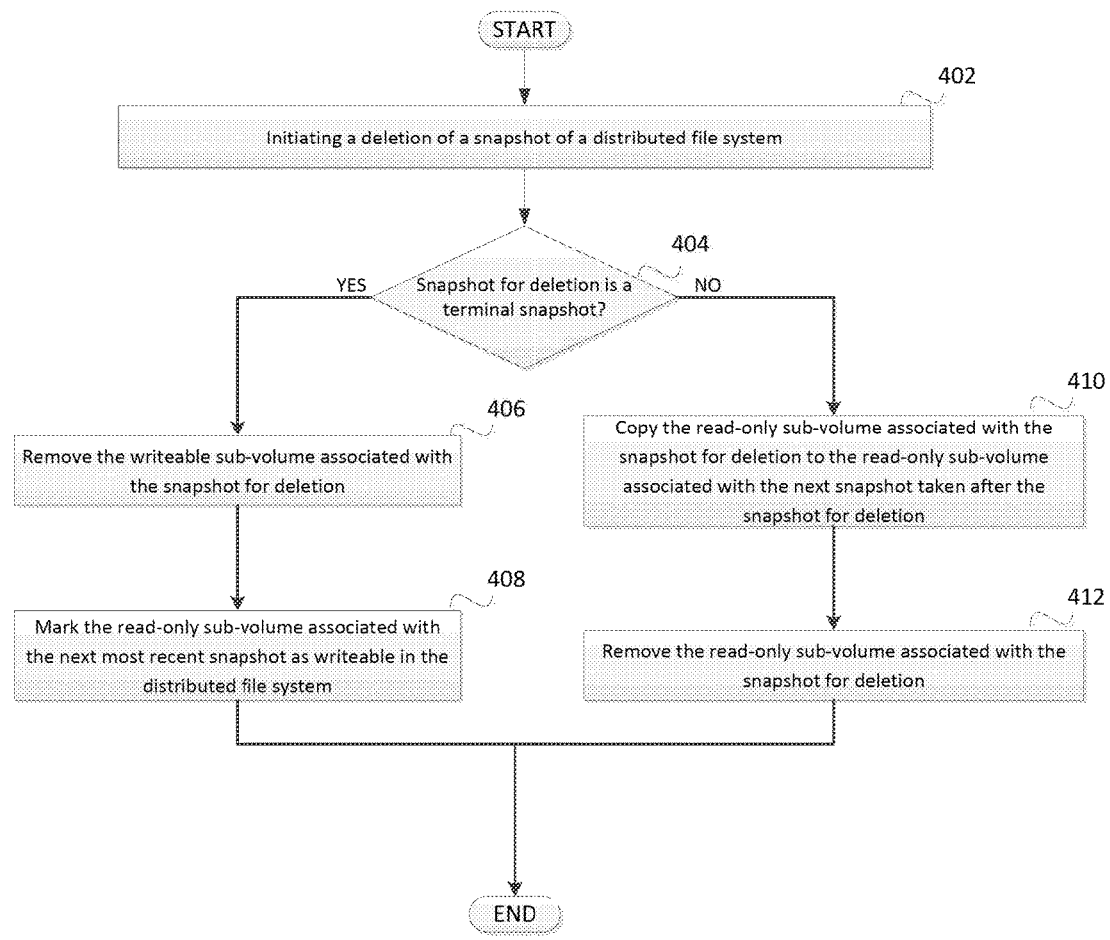
FIG. 4 depicts a flow diagram of an example method of deleting a snapshot according to some aspects of the disclosure.

FIG. 4 depicts a flow diagram of an example method of deleting a snapshot according to some aspects of the disclosure. In block 402, the distributed file system initiates a deletion of a snapshot of a volume of a distributed file system. For example, the snapshot deletion may be initiated in response to a request by a client device. In some implementations, the volume may have a policy that dictates when a snapshot is deleted. For example, a policy may indicate that a snapshot should be retained for only a certain amount of time, that only a certain number of snapshots should be maintained, or that snapshots should only use a certain amount of resources.

In block 404, the distributed file system determines if the snapshot for deletion is a terminal snapshot. A terminal snapshot may be a snapshot based on the current writeable sub-volume. If the snapshot for deletion is the terminal snapshot, the writeable sub-volume associated with the volume for deletion is removed in block 406. Then, moving on to block 408, the distributed file system marks the read-only sub-volume associated with the most recent previous snapshot as writeable. Thus, the terminal snapshot is deleted and the previous snapshots are maintained in the distributed file system.

If the distributed file system determines in block 404 that the snapshot for deletion is not the terminal snapshot, then the example method continues to block 410. In block 410, the distributed file system copies the read-only sub-volume associated with the snapshot for deletion to the read-only sub-volume associated with the next snapshot taken after the snapshot for deletion. For example, any files modified during the snapshot for deletion may be copied as they are stored in the associated read-only sub-volume to the more recent read-only sub-volume. Thus, the distributed file system maintains a complete record of in the chain of read-only snapshots and stored in the snapshot closest in time after the changes were made in the distributed file system.

Moving on to block 412, the distributed file system removes the read-only sub-volume associated with the snapshot for deletion. For example, the read-only sub-volume may be deleted from the distributed file system and the entry for the sub-volume may be removed from the distributed file system's directories.

Figure 5:
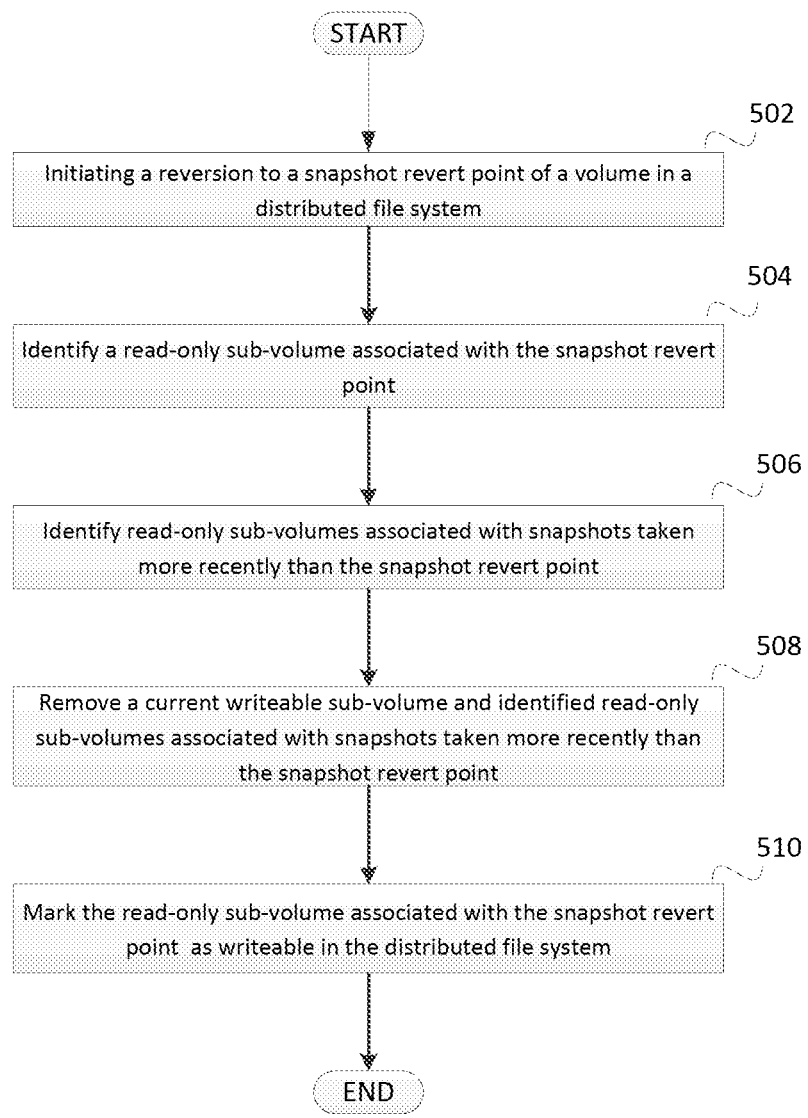
FIG. 5 depicts a flow diagram of an example method of reverting back to a snapshot for a volume according to some aspects of the disclosure.

FIG. 5 depicts a flow diagram of an example method of reverting back to a snapshot for a volume according to some aspects of the disclosure. In block 502, the distributed file system initiates a reversion to a snapshot reversion point of a volume in a distributed file system. For example, the distributed file system may initiate the reversion in response to instructions received from a client device. As another example, a reversion to a snapshot reversion point may occur due to a system error. The distributed file system may have lost or corrupted data and attempt to retrieve the data by initiating a reversion to a snapshot reversion point.

In block 504, the distributed file system identifies a read-only sub-volume associated with the snapshot reversion point. The read-only sub-volume may be identified by a file name, a file path, or another indication of the sub-volume's location. The particular read-only sub-volume may be selected by the distributed file system as being the most recent snapshot before a particular point in time. The read-only sub-volume for the snapshot reversion point may also be identified by the specific time the snapshot was taken (e.g., the time the read-only sub-volume was marked read-only by the distributed file system).

In block 506, the distributed file system identifies read-only sub-volumes associated with snapshots taken more recently than the snapshot reversion point. These sub-volumes may include data indicating changes made after the snapshot reversion point, and so should not be considered after the reversion. The sub-volumes may be identified based on metadata associated with them. For example, the metadata may indicate a time when a snapshot associated with a read-only sub-volume was created or when the sub-volume was marked read-only. In some implementations, the distributed file system may maintain a record of the sub-volumes and identify the read-only sub-volumes to be removed based on that record. In some implementations, the distributed file system may store the sub-volumes in a chain and identify those sub-volumes more recent in the chain than the reversion point as sub-volumes to remove. In certain situations, identifying read-only sub-volumes to remove may return no sub-volumes. For instance, when there are no read-only sub-volumes because there is only one snapshot that comprises the original volume or when the most recent snapshot is selected as the reversion point.

In block 508, the distributed file system may remove the sub-volumes identified in block 506 and the current writeable sub-volume. If in block 506, the distributed file system did not identify any read-only sub-volumes for removal, then the distributed file system may just remove the current writeable sub-volume.

Moving on to block 510, the distributed file system marks the read-only sub-volume associated with the snapshot reversion point as writeable in the distributed file system. Thus, any changes to the volume occurring after the snapshot reversion point are removed from the file system. The distributed file system maintains the changes to the volume that occurred before the snapshot reversion point. Thus, the distributed file system will be in a state it was at the time the snapshot was taken.

Figure 6:
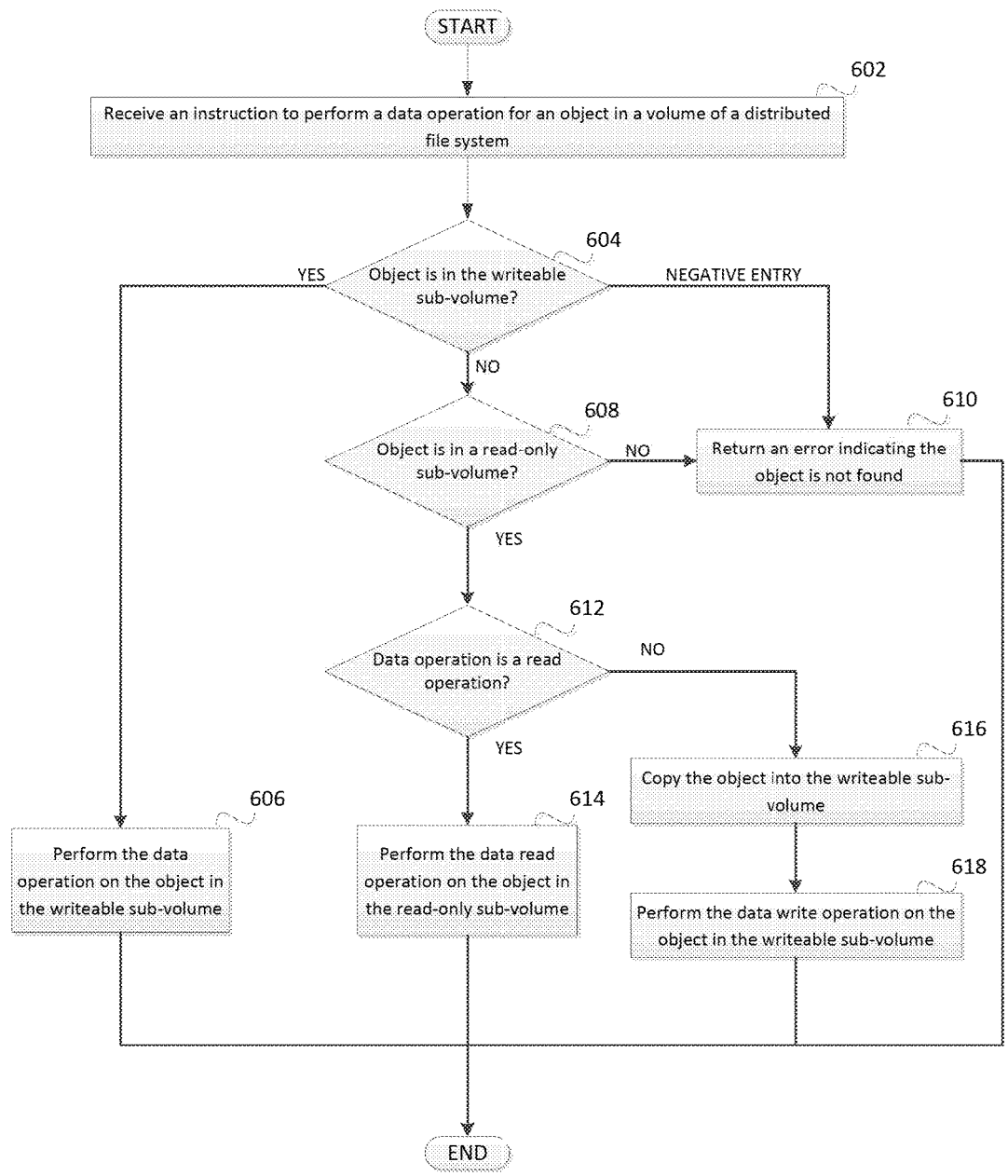
FIG. 6 depicts a flow diagram of an example method of performing data operations on a volume of a distributed file system that has one or more snapshots according to some aspects of the disclosure.

FIG. 6 depicts a flow diagram of an example method of performing data operations on a volume of a distributed file system that has one or more snapshots according to some aspects of the disclosure. Beginning in block 602 the distributed file system receives an instruction to perform a data operation on an object in the volume. The data operation may be a read or a write instruction received from a client device, for instance. The distributed file system may receive the instruction at a snapshot management system 210 as described with reference to FIG. 2 or at a module for translating the address of the instruction to a location in a sub-volume of the volume.

In order to perform the data operation, the distributed file system may locate the object in the volume. The distributed file system may initiate a search for the object in a current writeable sub-volume and proceed to look at further back snapshots until the object is found. In this way, the distributed file system identifies the most recent copy of the object. Therefore, in block 604, the distributed file system determines if the object is in the writeable sub-volume.

If in block 604, the distributed file system determines the object is in the writeable sub-volume, the method may continue to block 606. In block 606, the distributed file system performs the data operation on the object in the writeable sub-volume. For example, the distributed file system may read from the object and return data to a client device. The distributed file system may also write to the object to modify the object.

In certain situations, the distributed file system may find the objet in the sub-volume as a negative entry. For example, as discussed above, a negative entry may indicate that the object has been deleted. If a negative entry is identified by the distributed file system for the object, the method may continue to block 610 and return an error indicating the object is not found in the distributed file system.

If the object is not found in the current writeable sub-volume, the distributed file system may look for the object in read-only sub-volumes. The distributed file system may search the read-only sub-volumes in order from the most recent back to the original volume. The first time the object is identified in a read-only sub-volume, the method may continue to block 612. If the object is not identified in a read-only sub-volume or the original volume, the method may continue to block 610 and the distributed file system may return an error indicating the object was not found. In some implementations, the distributed file system may return a different error if a negative entry is found for the object than if no entry is found for the object.

If the distributed file system finds the object in a read-only sub-volume, it may proceed to perform the operation. In block 612, the distributed file system determines if the data operation is a read operation. If the data operation is a read operation, the distributed file system may continue to block 614 and perform the read operation on the object in the read-only sub-volume. The results of the operation may then be returned to the client device or other entity that provided the instruction to perform the operation.

If the data operation is a write operation, the distributed file system may not perform the operation in the read-only sub-volume. Therefore, the distributed file system may create a copy of the object in the writeable sub-volume to perform the operation. For example, in block 616 of FIG. 6, the distributed file system may copy the object into the writeable sub-volume. In some implementations, the object is individually copied into the writeable sub-volume. In some implementations, a partition of data larger or smaller than the object may be copied to the writeable sub-volume. For example, if the object is stored in a memory partition including other files or objects, the entire logical block may be copied to the writeable sub-volume. In addition, the object may be stored as multiple partitions. For instance, the object may be stored as multiple partitions on more than one server. The distributed file system may copy one of the partitions to which the write operation is directed to the writeable sub-volume while the remaining partitions are maintained in read-only sub-volumes.

In block 618, the distributed file system performs the write operation on the object in the writeable sub-volume. Thus, the writeable sub-volume includes a copy of the object as modified by the write command and the one or more read-only sub-volumes maintain a copy of the object as an unmodified snapshot.

Figure 7:
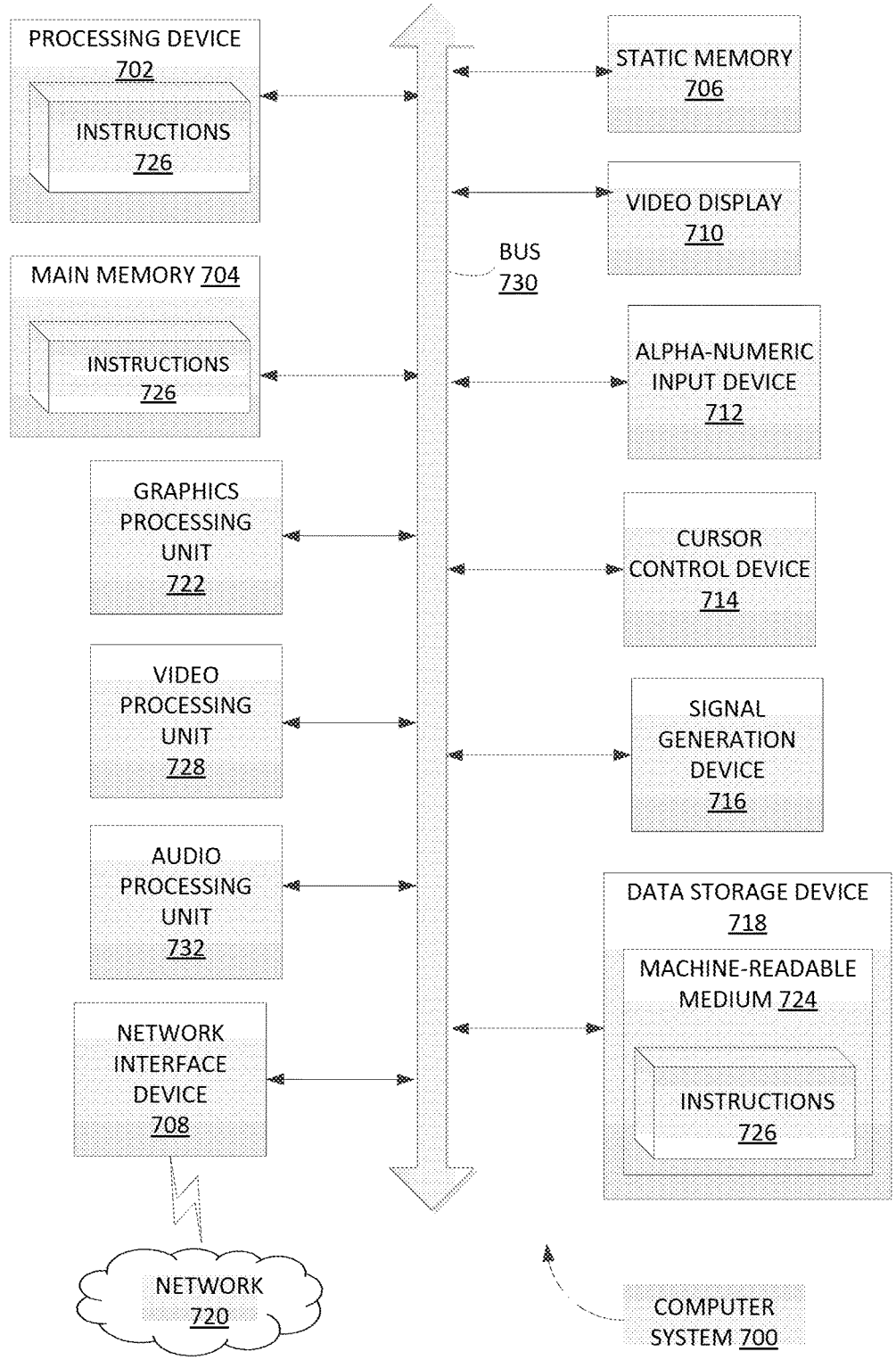
FIG. 7 depicts a block diagram of a computer system operating in accordance with one or more aspects of the present disclosure.

FIG. 7 depicts a block diagram of a computer system operating in accordance with one or more aspects of the present disclosure. In various illustrative examples, computer system 700 may correspond to example system architecture 100 of FIG. 1. For example computer system 700 may correspond to example architecture for one or more storage nodes 112 or for other components of distributed file system 110 illustrated in FIG. 1.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processor 702, a main memory 704 (e.g., random access memory (RAM)), a non-volatile or static memory 706 (e.g., read-only memory (ROM) or electrically-erasable programmable ROM (EEPROM)), and a data storage device 718, which may communicate with each other via a bus 730.

Processor 702 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 708. Computer system 700 also may include a video display unit 710 (e.g., an LCD), an alpha-numeric input device 712 (e.g., a keyboard), a cursor control device 714 (e.g., a mouse), and a signal generation device 716.

Data storage device 718 may include a non-transitory computer-readable storage medium 724 on which may store instructions 726 encoding any one or more of the methods or functions described herein, including instructions encoding management of the distributed file system 110 in FIG. 1 implementing methods described with reference to FIGS. 3-6.

Instructions 726 may also reside, completely or partially, within volatile memory 704 and/or within processor 702 during execution thereof by computer system 700, hence, volatile memory 704 and processor 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "receiving," "transmitting," "arranging," "combining," "generating," "inspecting," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various systems may be used in accordance with the teachings described herein, or it may prove convenient to construct more specialized apparatus to perform the methods disclosed and/or individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
generating, by a processing device, a first writeable sub-volume associated with a first snapshot of a volume distributed across a plurality of storage nodes of a distributed file system;
identifying, by the processing device, a second writeable sub-volume associated with a second snapshot of the volume taken prior to the first snapshot;
marking, by the processing device, the second writeable sub-volume of the distributed file system as read-only;
initiating a reversion to a snapshot revert point of the volume;
identifying a read-only sub-volume associated with the snapshot revert point;
identifying a plurality of read-only sub-volumes associated with snapshots taken more recently than the snapshot revert point;
removing the first writeable sub-volume and the plurality of read-only sub volumes; and
marking the read-only volume associated with the snapshot revert point as writeable.

2. The method of claim 1, further comprising:
initiating, by the processing device, a second snapshot of the volume of the distributed file system;
creating, by the processing device, a third writeable sub-volume associated with the volume of the distributed file system; and
marking, by the processing device, the first writable sub-volume associated with the distributed file system as read-only.

3. The method of claim 1, further comprising:
initiating a deletion of a snapshot for deletion from the distributed file system;
copying a first read-only sub-volume associated with the snapshot for deletion to a second read-only sub-volume associated with a snapshot taken subsequent to the snapshot for deletion; and
removing the first read-only sub-volume associated with the snapshot for deletion from the distributed file system.

4. The method of claim 1, further comprising:
receiving an instruction to perform a write operation for an object in the volume;
determining that the object is in a read-only sub-volume associated with the volume;
copying the object from the read-only sub-volume to the first writeable sub-volume; and
performing the write operation on the object in the first writeable sub-volume.

5. The method of claim 1, further comprising:
receiving an instruction to perform a deletion of an object in the volume;
determining that the object exists in a read-only sub-volume associated with the volume; and
generating a negative entry for the object in the first writeable sub-volume.

6. The method of claim 5, further comprising:
receiving an instruction to perform a read on the object in the volume;
generating an error in response to determining that the negative entry exists for the object; and
returning the error to a client device that provided the instruction.

7. The method of claim 1, wherein the first snapshot enables the distributed file system to revert to a corresponding snapshot reversion point.

8. A system comprising:
a memory; and
a processing device operatively coupled to the memory, the processing device to:
create, by the processing device, a first writeable sub-volume associated with a volume distributed across a plurality of storage nodes of a distributed file system;
identify, by the processing device, a second writeable sub-volume associated with a previous snapshot;
mark, by the processing device, the second writeable sub-volume of the distributed file system as read-only;
receive an instruction to perform a write operation for an object in the volume;
determine that the object is in a read-only sub-volume associated with the volume;
copy a partition of the object from the read-only sub-volume to the first writeable sub-volume; and
perform the write operation on the partition of the object in the first writeable sub-volume.

9. The system of claim 8, wherein the processing device is to create the first writeable sub-volume in response to receiving a request to generate a snapshot.

10. The system of claim 8, wherein the processing device is further to:
identify a first read-only sub-volume associated with a snapshot for deletion;
identify a second read-only sub-volume, wherein the second read-only sub-volume is associated with a snapshot taken subsequent to the snapshot for deletion;
copy the first read-only sub-volume to the second read-only sub-volume; and
remove the first read-only sub-volume from the distributed file system.

11. The system of claim 8, wherein the processing device is further to:
identify a first read-only sub-volume associated with a snapshot reversion point;
identify a second read-only sub-volume associated with a snapshot taken more recently than the snapshot reversion point;
remove the first writeable sub-volume associated with the volume from the distributed file system;
remove the identified second read-only sub-volume from the distributed file system; and mark the first read-only sub-volume associated with the snapshot reversion point as writeable.

12. The system of claim 8, wherein the processing device is further to:
receive an instruction to perform a read operation on an object in the volume;
determine that the object does not exist in the first writeable sub-volume;
determine that the object exists in a read-only sub-volume; and
perform the read operation on the object in the read-only sub-volume.

13. The system of claim 8, wherein the memory and the processing device are located on a storage node of the distributed file system.

14. The system of claim 8, wherein the processing device is further to:
receive an instruction to delete a snapshot for deletion;
determine that the snapshot for deletion is a terminal snapshot;
remove the first writeable sub-volume associated with the snapshot for deletion; and
mark a read-only sub-volume associated a most recent snapshot as writeable.

15. A non-transitory machine-readable storage medium storing instructions that cause a processing device to:
initiate, by a processing device, a snapshot of a volume distributed across a plurality of storage nodes of a distributed file system;
create, by the processing device, a writeable sub-volume associated with the volume of the distributed file system; and
mark, by the processing device, the volume of the distributed file system as read-only;
receiving an instruction to perform a deletion of an object in the volume;
determining that the object exists in a read-only sub-volume associated with the volume; and
generating a negative entry for the object in the writeable sub-volume.

16. The non-transitory machine-readable storage medium of claim 15, further comprising instructions to cause the processing device to:
initiate a second snapshot of the volume of the distributed file system:
create a second writeable sub-volume associated with the volume of the distributed file system; and
mark the writeable sub-volume associated with the volume of the distributed file system as read-only.

17. The non-transitory machine-readable storage medium of claim 15, further comprising instructions to cause the processing device to:
initiate a reversion to the snapshot;
remove the writeable sub-volume from the distributed file system; and
mark the volume of the distributed file system as writeable.

* * * * *